United States Patent
Campbell et al.

(10) Patent No.: US 11,181,462 B2
(45) Date of Patent: Nov. 23, 2021

(54) NON-DESTRUCTIVE METHOD TO DETERMINE POROSITY IN METALLIC COATINGS

(71) Applicant: International Business Machines Corporation, Armonk, NY (US)

(72) Inventors: Eric J. Campbell, Rochester, MN (US); Joseph Kuczynski, North Port, FL (US); Sarah K. Czaplewski-Campbell, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 16/206,340

(22) Filed: Nov. 30, 2018

(65) Prior Publication Data

US 2020/0173903 A1    Jun. 4, 2020

(51) Int. Cl.
*G01N 15/08* (2006.01)
*G01N 21/64* (2006.01)
*G01N 27/20* (2006.01)

(52) U.S. Cl.
CPC ......... *G01N 15/088* (2013.01); *G01N 21/643* (2013.01); *G01N 27/205* (2013.01)

(58) Field of Classification Search
CPC .... G01N 15/08; G01N 15/088; G01N 21/643; G01N 21/62; G01N 21/64; G01N 21/6495; G01N 21/6497; G01N 21/6439; G01N 21/6441; G01N 27/205
See application file for complete search history.

(56) References Cited

U.S. PATENT DOCUMENTS

| | | | |
|---|---|---|---|
| 3,386,920 A * | 6/1968 | Alburger | C09K 11/06 252/301.19 |
| 3,459,505 A | 8/1969 | Tweed | |
| 3,719,884 A | 3/1973 | Laroche | |
| 4,929,837 A | 5/1990 | DiVita et al. | |
| 5,317,272 A | 5/1994 | Jorgens | |
| 6,344,171 B1 | 2/2002 | Koya | |
| 6,361,205 B2 | 3/2002 | Anderson | |
| 6,777,948 B2 | 8/2004 | Dominelli et al. | |
| 6,864,489 B2 | 3/2005 | Chen et al. | |

(Continued)

FOREIGN PATENT DOCUMENTS

| | | |
|---|---|---|
| JP | H10123067 A | 5/1998 |
| RU | 2015124966 A | 1/2017 |

OTHER PUBLICATIONS

Banerjee et al. "Nickel(II)-Induced Excimer Formation of a Naphthalene-Based Fluorescent Probe for Living Cell Imaging." Inorganic Chemistry, vol. 51, No. 10, 2012, pp. 5699-5704, doi:10.1021/ic300130y.

(Continued)

*Primary Examiner* — Son T Le
*Assistant Examiner* — Dustin R Dickinson
(74) *Attorney, Agent, or Firm* — Jared C. Chaney

(57) ABSTRACT

A multilayer component is coated with a fluorogenic probe designed to give off florescence when in contact with one or more metals in the multilayer component. The fluorogenic probe is exposed to radiation. The intensity and wavelength of the florescence is measured to determine a porosity of the one or more layers of the multilayer component.

20 Claims, 5 Drawing Sheets

(56) References Cited

U.S. PATENT DOCUMENTS

| | | | |
|---|---|---|---|
| 6,884,998 | B2 | 4/2005 | Nichols |
| 7,038,201 | B2 | 5/2006 | Nichols |
| 7,053,625 | B2 | 5/2006 | Dominelli et al. |
| 7,368,743 | B2 | 5/2008 | Nichols |
| 8,871,893 | B2 | 10/2014 | Phillips et al. |
| 9,329,238 | B1 | 5/2016 | Carson et al. |
| 9,885,659 | B1 | 2/2018 | Campbell et al. |
| 2008/0011724 | A1 | 1/2008 | Acker |
| 2012/0107184 | A1 | 5/2012 | Asiyanbola |
| 2014/0221700 | A1 | 8/2014 | Radivojevic et al. |
| 2017/0243428 | A1 | 8/2017 | Lawandy |
| 2017/0314912 | A1* | 11/2017 | Krishnan ............ G03F 7/00 |
| 2018/0095038 | A1 | 4/2018 | Campbell et al. |
| 2018/0120215 | A1 | 5/2018 | Jin et al. |

OTHER PUBLICATIONS

Garner et al. "Studies of a Fluorogenic Probe for Palladium and Platinum Leading to a Palladium-Specific Detection Method." Chem. Commun., No. 1, Nov. 18, 2018, pp. 86-88, doi:10.1039/b814197e.

Jiang et al. "A Colorimetric and Ratiometric Fluorescent Probe for Palladium." Organic Letters, vol. 13, No. 18, 2011, pp. 4922-4925, doi:10.1021/ol202003j.

"Chapter 19—Indicators for Ca2+, Mg2+, Zn2+ and Other Metal Ions." Molecular Probes Handbook: A Guide to Fluorescent Probes and Labeling Technologies, 11th Edition (2010), Thermo Fisher Scientific, pp. 829-882. <https://www.thermofisher.com/content/dam/LifeTech/global/technical-reference-library/Molecular%20Probes%20Handbook/chapter-pdfs/Ch-19-Ca-Mg-Zn-Ion-Indicators.pdf?icid=WE216841>.

Santra et al. "Fluorescent Detection of *Palladium* Species with an O-Propargylated Fluorescein." Chemical Communications, vol. 46, No. 22, May 2010, pp. 3964-3966, doi:10.1039/c001922d.

Wang et al. "Nickel(II) and Iron(III) Selective off-on-Type Fluorescence Probes Based on Perylene Tetracarboxylic Diimide." Organic & Biomolecular Chemistry, vol. 8, No. 5, 2010, pp. 1017-1026, doi:10.1039/b921342b.

List of IBM Patents or Patent Applications Treated as Related, Nov. 30, 2018, 2 pgs.

* cited by examiner

NON-DESTRUCTIVE METHOD TO DETERMINE POROSITY IN METALLIC COATINGS

BACKGROUND

Aspects of the present disclosure relate to metal coatings and more particular aspects relate to determining porosity in metal coatings.

Metal coatings are used to provide reliable contact resistance values for mating surfaces for connectors and printed circuit boards (PCBs). Coating porosity results from unoptimized plating/deposition processes and may lead to corrosion and signal degradation. A conventional method to evaluate the robustness of metal platings is via a fuming nitric acid procedure, a very aggressive, destructive method.

SUMMARY

The present invention provides a non-destructive method to determine porosity in metallic coatings. Some embodiments of the present disclosure can be illustrated by a method comprising, applying a fluorogenic probe a to a surface of a multilayer component, exposing the fluorogenic probe to radiation, detecting a response to the radiation exposure in the fluorogenic probe, and determining a porosity of the multilayer component based on the detecting.

Some embodiments of the present disclosure can be illustrated by a method comprising, applying a fluorogenic probe to a surface of a multilayer component comprising one or more metal layers, exposing the fluorogenic probe to ultraviolet (UV) radiation, detecting a response to the UV radiation from the fluorogenic probe, and determining a prevalence of pores penetrating to a layer of the one or more metal layers based on the detecting.

Some embodiments of the present disclosure can be illustrated by a system comprising, a fluorogenic probe applied to a surface of a multilayer component a radiation source configured to expose the fluorogenic probe on the surface of a multilayer component to radiation, a sensor configured to detect a response to the radiation exposure of the fluorogenic probe, and a processor configured to determine a porosity of the multilayer component based on the response.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
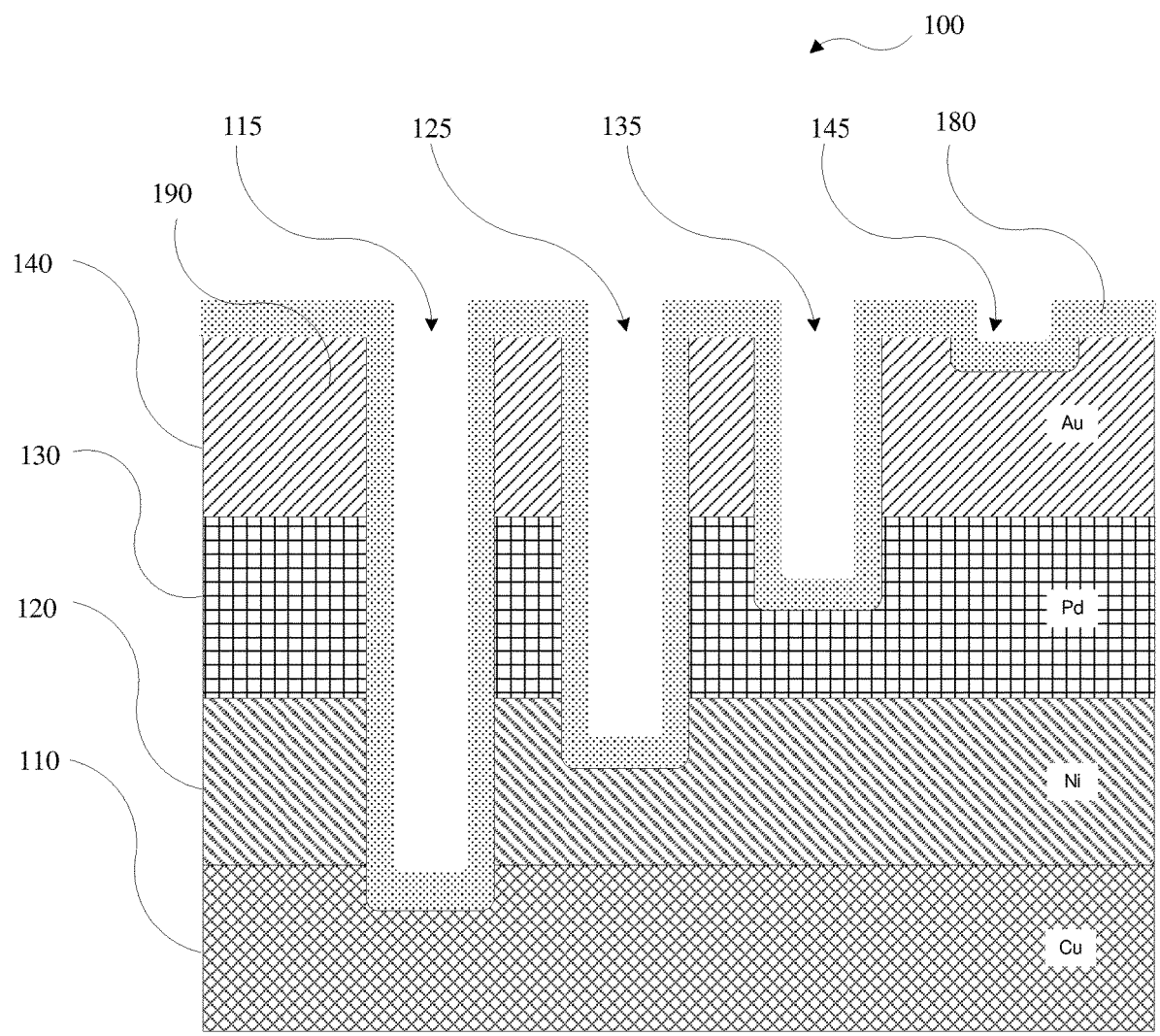
FIG. 1 illustrates a section of an exemplary depiction of a multilayer component with several pores treated with a fluorogenic probe, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to metal coatings and more particular aspects relate to detecting porosity in metal coatings. While the present disclosure is not necessarily limited to such applications, various aspects of the disclosure may be appreciated through a discussion of various examples using this context.

"Porosity" in electrical connectors refers to discontinuities that expose the underplate or base material of the electrical connector. Porosity can originate during the manufacturing process. Porosity is often a concern with gold-plated surfaces. There are two types of pores: active or passive. An active pore is one that penetrates through the one or more deposited layer (such as gold, palladium, and/or nickel) to the base metal (e.g., copper). Active pores can allow corrosion products to exit and spread on the contact surface and generally degrade connection quality of electrical connectors. Passive pores penetrate the external layer, but do not penetrate to the base material.

Pores are generally small and cannot be observed under normal magnification, such as a loupe or a low-power stereo microscope. Active pores may not affect the quality of a connection initially but can degrade the quality of a connection over the life of a connector as the exposed underlying metal becomes corroded. Pores can especially be a concern in harsh environments where conditions promote corrosion.

Currently, testing methods for porosity in multilayer components involve destructive testing. For example, the most common test method used in the electronics industry is ASTM B735, "Standard Test method For Porosity in Gold Coatings on Metal Substrates by Nitric Acid Vapor." This test method employs nitric acid ($HNO_3$) vapor at low relative humidity. Reaction of the gaseous mixture with a corrodible base metal at pore sites produces reaction products that appear as discrete spots on the surface. Individual spots are counted with the aid of a loupe or low-power stereo microscope, so the test is time consuming. The nitric acid vapor test is too severe to be used for gold coatings less than 0.6 µm (25 µin.) in thickness. It is also not suitable for coatings that are less noble than gold or platinum, such as palladium and its alloys, or gold-flashed palladium and its alloys. The corrosion caused by nitric acid vapor test destroys test components during testing.

Fluorogenic probes are molecules (e.g., fluorophore molecule) that show fluorescence after a specific reaction. Fluorescence is the re-emitting of light upon light excitation. Fluorogenic probes are non- or weakly fluorescent reagents that produce highly fluorescent products when they come in contact with specific stimuli, compounds, or elements. When light from an external source hits a fluorophore molecule, the molecule can absorb the light energy. If the energy absorbed is sufficient, the molecule reaches a higher-energy state, called an excited state. This process is known as "excitation." The emission maximum for the fluorophore is always at a longer wavelength (i.e., has lower energy) than the excitation radiation. This difference between the excitation energy and emission energy is called the Stokes shift. The magnitude of the Stokes shift is determined by the electronic structure of the fluorophore and is a characteristic of the fluorophore molecule which can vary based on the materials present for the fluorophore molecule to react with. Thus, the Stokes shift for a particular fluorophore molecule will change based on what materials are available to for a fluorophore molecule to react with. A variety of different fluorophore molecules are available. Tailored fluorogenic probes have been developed for the detection of individual elements.

In some embodiments, fluorogenic probes can be used to detect a presence of one or more specific metals. For example, when exposed to a light source, a fluorogenic probe in contact with copper, palladium, and gold may give off fluorescent light with a peak wavelength of approximately 350 nm (nanometer), but when in contact with nickel the fluorogenic probe may give off fluorescent light with a peak wavelength of approximately 450 nm. Similarly, in some embodiments, the intensity of light given off by the fluorogenic probe in contact with target elements may have a higher intensity than other elements. For example, when copper and nickel are present in the same concentrations and exposed to the same fluorogenic probe, the fluorogenic probe in contact with copper may give off an intensity of <10 a.u. (arbitrary units) while the fluorogenic probe in contact with nickel could give off an intensity of approximately 1200 a.u.

In some embodiments, fluorogenic probes can be used to detect an exposed amount of an element. In some embodiments, when a surface is exposed to a fluorogenic probe tailored for a specific element, the fluorescence intensity will increase as a function of the presence of the element.

In some embodiments, fluorogenic probes are used to detect porosity in multilayered components. In some embodiments, the fluorogenic probes are used to detect the presence of pores. In some embodiments, the fluorogenic probes are used to detect the depth of pores. In some embodiments, the fluorogenic probes are used to detect the prevalence of pores.

FIG. 1 shows an exemplary cross-section of a multilayered component 100, consisting of several layers and several pores that could be tested using fluorogenic probe 180. Surface 190 (including pores 115, 125, 135, and 145) is an exposed side of multilayered component 100, other sides are cross sections. For example, the portion of multilayered component 100 shown in FIG. 1 could be a cross-section of metal layers of an electronic connector for a computer system. Surface 190 would be an exposed surface while the other surfaces are not exposed. More or fewer layers may be used and the layers may be composed of materials other than those shown. In an exemplary embodiment depicted in FIG. 1, a multilayered component 100 consists of a first layer 110, a second layer 120, a third layer 130, and a fourth layer 140. As illustrated, first layer 110 is a copper layer (Cu), second layer 120 is a nickel layer (Ni), third layer 130 is palladium (Pd), and fourth layer 140 is gold (Au). In some examples, layer thickness can range between 0.25-25 μm (micrometers). Exemplary multilayered component 100 has a first pore 115 that penetrates down into layer 110, second pore 125 that penetrates down into second layer 120, third pore 135 that penetrates down into third layer 130, and a fourth pore 145 that penetrates down into fourth layer 140. Pores are not intended to show scale or shape. The number of layers and the composition of the layers is given as an example. Components may have more or fewer layers or have different compositions.

In some embodiments, fluorogenic probes (such as fluorogenic probe 180) will be applied to a multilayered component, such as multilayered component 100. In some embodiments, several different fluorogenic probes will be applied to the multilayered component. For example, multilayered component 100 could be exposed to three fluorogenic probes each one being designed to fluoresce when applied to Cu, Ni, or Pd. While, as illustrated, fluorogenic probe 180 is applied as a layer on surface 190, in some embodiments the fluorogenic probe may be applied in different forms. For example, in some embodiments the probe may take the form of intermittent droplets that is sprayed on the multilayer components. In other embodiments the multilayer component may be completely submerged in a liquid form of the fluorogenic probe. The multilayer component may then be removed from the submersion, but some of the fluorogenic probe may remain adhered to surface 190.

In some embodiments, fluorescence readings will be used to determine the penetration depth of pores. In some embodiments, after being treated with one or more fluorogenic probes (such as fluorogenic probe 180), the fluorogenic probes in contact with exposed metal on the surface of the pores, when exposed to radiation, would give off fluorescence readings indicating the exposed material in the pores. For example, after fluorogenic probe 180 has reacted with Pd in pore 135, some fluorophore molecules of fluorogenic probe 180 that are in pore 135 would give off a reading indicating Pd is present. After fluorogenic probe 180 has reacted with Ni in pore 125, some fluorophore molecules of fluorogenic probe 180 that are in pore 125 would give off a reading indicating Ni is present. After being fluorogenic probe 180 has reacted with Cu in pore 115, some fluorophore molecules of fluorogenic probe 180 that are in pore 115 would give off a reading indicating Cu is present. In some embodiments, a fluorogenic probe in a pore may also give off readings for all materials in the pores. For example, pore 115 has exposed Pd from layer 130, Ni from layer 120, and Cu from layer 110. When treated with fluorogenic probes for Pd, Ni, and Cu compounds, some fluorophore molecules of fluorogenic probe 180 that are in pore 115 may give off readings for Pd, Ni, and Cu. As illustrated, fluorophore molecules of fluorogenic probe 180 that are in pore 145 would not give off readings for Pd, Ni, and Cu since pore 145 does not penetrate into layers 110, 120, and/or 130. As illustrated, pore 115 would be an active pore and pores 125, 135, and 145 would be passive pores.

In some embodiments, fluorescence readings may be used to determine a presence of pores that penetrate to a specific layer. For example, if surface 190 (including pores 115, 125, 135, and 145) of multilayered component 100 were treated with a fluorogenic probe that reacts with Cu but does not react with Au, Pd, and Ni, then only pores such as pore 115 that penetrated down to first layer 110 would be detected.

Figure 2:
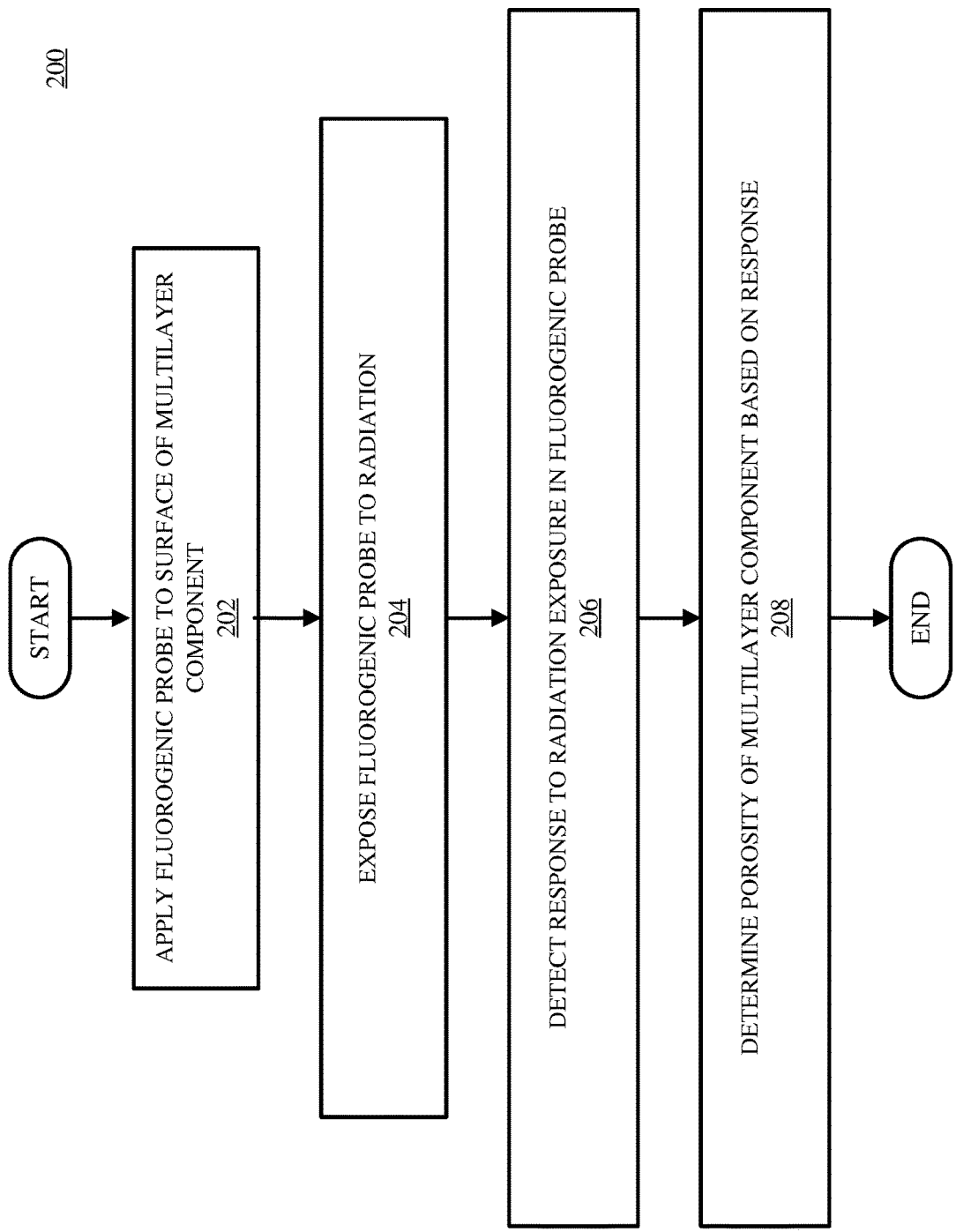
FIG. 2 is a block diagram illustrating a method of determining porosity in a multilayer component using fluorogenic probes, in accordance with some embodiments of the present disclosure.

FIG. 2 illustrates a flowchart of an example method 200 of a non-destructive method to determine porosity in metal coatings. In some embodiments, a base level of fluorescence is measured before starting block 202.

In method 200, a fluorogenic probe is applied to a surface comprising one or more layers at block 202. The fluorogenic probe may be selected based on the composition of the layers. For example, if the base material, or first layer, includes Cu, then a fluorogenic probe that produces fluorescence in the presence of Cu may be selected. In some embodiments, the "fluorogenic probe" could actually be a composition of one or more fluorogenic probes, each selected for one or more materials.

In method 200, the fluorogenic probe will be exposed to radiation at block 204. In some embodiments, the radiation is ultraviolet (UV) radiation. In some embodiments, the specific wavelength of radiation emitted will be selected based on the selection of the fluorogenic probe and a target excitation wavelength that will stimulate re-emittance of light from the fluorogenic probe when in contact with the subject material. For example, exposing a fluorogenic probe to a first and second wavelength of light may not change the emission profile (i.e., wavelengths in which light is re-emitted upon excitation of a fluorophore molecules in a fluorogenic probe), but it may produce variations in the re-emission intensity. In some embodiments, a range of wavelengths will be used.

In some embodiments, the radiation source may include one or more emitters, each of which may be monochromatic, multichromatic, spectral, and/or broadband. Monochromatic sources include UV lasers and light emitting diodes (LED's). Multichromatic sources include UV lasers or LED bars or grids with emitters operating at different wavelengths, or broadband sources radiating through wavelength specific filters. Spectral UV sources include sources that emit a spectrum of UV radiation such as discharge emitters (for example Hg vapor lamps). Broadband UV sources have broad emission spectra that are broader than emission spectra of individual emitters, typically including more than one spectral emitter. Broadband sources may be broadband laser sources (i.e. UV laser emitters that emit photons across the gain spectrum of the emitter, such as tunable UV lasers and chirped UV lasers) or broadband spectral sources, including sources using two or more types of UV lamps.

In some embodiments, one or more photons (referred to herein as "excitation photons") are supplied by an external source such as an incandescent lamp or a laser and absorbed by the fluorogenic probe, creating an excited electronic singlet state in the fluorogenic probe.

In some embodiments, one or more photons are emitted or re-emitted, returning the fluorogenic probe to its ground state. Due to energy dissipation during the excited-state lifetime, the energy of this photon (referred to herein as an "emitted photon") is lower, and therefore of longer wavelength, than the excitation photon(s) (e.g., photon(s) emitted from the radiation source). In some embodiments, Stokes shift allows emission photons to be detected against a low background and isolated from excitation photons. In some embodiments, the emission intensity of the fluorogenic probe is proportional to the amplitude of the radiation exposure at the excitation wavelength. In some embodiments, excitation of a fluorophore molecule at different wavelengths does not change the emission profile but does produce variations in fluorescence emission intensity corresponding to the amplitude of the radiation exposure.

In some embodiments, the radiation will react with the fluorogenic probes to re-emit radiation in certain wavelengths depending on the elements or compounds present. In some embodiments, the absorption and re-emitting process is repeatable, allowing the same fluorogenic probe to be used to continually generate or re-emit detectable photons.

In method 200, the re-emissions from the fluorogenic probes will be detected in block 206. The re-emitted radiation can be detected with a detection system.

In some embodiments, the detection system can include wavelength filters to isolate emission photons from excitation photons and/or a detector that registers emission photons and produces a recordable output, usually as an electrical signal.

In some embodiments, a radiation sensor may be calibrated to sense radiation at the wavelength re-emitted by the fluorogenic probes. In some embodiments, the radiation sensor may sense the radiation emitted by the fluorogenic probes. This may include radiation from the fluorogenic probes that have reacted with a target material in or on the multilayer component and radiation from the fluorogenic probes that have reacted with other materials in the multilayer component. In some embodiments, target radiation is radiation of a wavelength that, when detected, indicates a target material. In some embodiments, the radiation sensor may measure intensity of the radiation emitted by the fluorogenic probes. In some embodiments, the radiation sensor may compare a measured intensity of target radiation to a measured intensity of background radiation to filter out radiation present before testing (e.g., radiation from ceiling lights in the test room). In some embodiments, the radiation sensor may determine a ratio of the intensity of radiation at a target wavelength to the intensity of radiation produced by the fluorogenic probe at other wavelengths. For example, if the purpose of a test was to detect porosity down to a Cu (the target material for this example) layer, the target radiation would be a wavelength of radiation produced by the fluorogenic probe that is reacting with Cu. In some embodiments, the radiation sensor may use the ratio to determine presence of a metal. For example, the radiation sensor may determine the presence of metal if the ratio is below a threshold value, or above a threshold value.

In some embodiments, a fluorogenic probe will re-emit a first wavelength of light when it reacts with a target metal and a second wavelength of light when it reacts with one or more other metals.

In block 208, a determination of the porosity of the multilayer component will be made. In some embodiments, a determination of porosity includes receiving a signal indicating the presence of one or more materials. For example, radiation with a wavelength indicating that a base material is present (such as Cu in layer 110 of FIG. 1) can indicate active porosity. In some embodiments, the intensity of radiation at the target wavelength can indicate an amount of porosity. For example, the more pores that penetrate down to layer 110 of FIG. 1, the more surface area of Cu is available for the fluorogenic probe to react with and thus the intensity will be higher as porosity increases. In some embodiments, a comparison of various wavelength readings is used to determine the prevalence of pores. For example, considering a system where gold is plated over copper, a fluorogenic probe could react with gold to produce a first wavelength and with copper at a second wavelength. As the porosity, or, number of pores, that penetrates through the gold layer and to the copper layer increases, the ratio of the intensity of the second wavelength to the first wavelength will increase. In some embodiments, prevalence is the number of pores, the concentration of pores in an area, the overall surface area exposed by the pores, and/or some combination therein.

In some embodiments, a comparison of various wavelength readings is used to determine a quantity or area of pores that have penetrated to each layer (such as layers 110, 120, 130, and 140 of FIG. 1). In some embodiments, the fluorogenic probe will be designed to express a different wavelength of light for each type of metal component present. In some embodiments, the fluorogenic probe will be designed to express a porosity for pores penetrating beyond an external layer (such as layer 140 of FIG. 1). Penetrating indicates breaching into a layer and exposing the material the layer is composed of.

In some embodiments, a series of fluorogenic probes will be used to determine the concentration of pores that penetrates to each level. For example, a first fluorogenic probe may be used to detect the concentration of a pores penetrating to a palladium layer. The first fluorogenic probe could then be neutralized or photobleached. A second fluorogenic probe may be used to detect the concentration of a pores penetrating to a nickel layer. The second fluorogenic probe could then be neutralized or photobleached. A third fluorogenic probe may be used to detect the concentration of pores penetrating to a copper layer. The third fluorogenic probe could then be neutralized or photobleached.

In some embodiments, radiation re-emission readings will be compared to samples with known porosity. For example, one or more sample readings could be produced by first running a sample through the fluorogenic probe detection process and then running the sample through a standardized destructive pore detection process. In some embodiments, a database of sample readings or test cases will be created.

Figure 3:
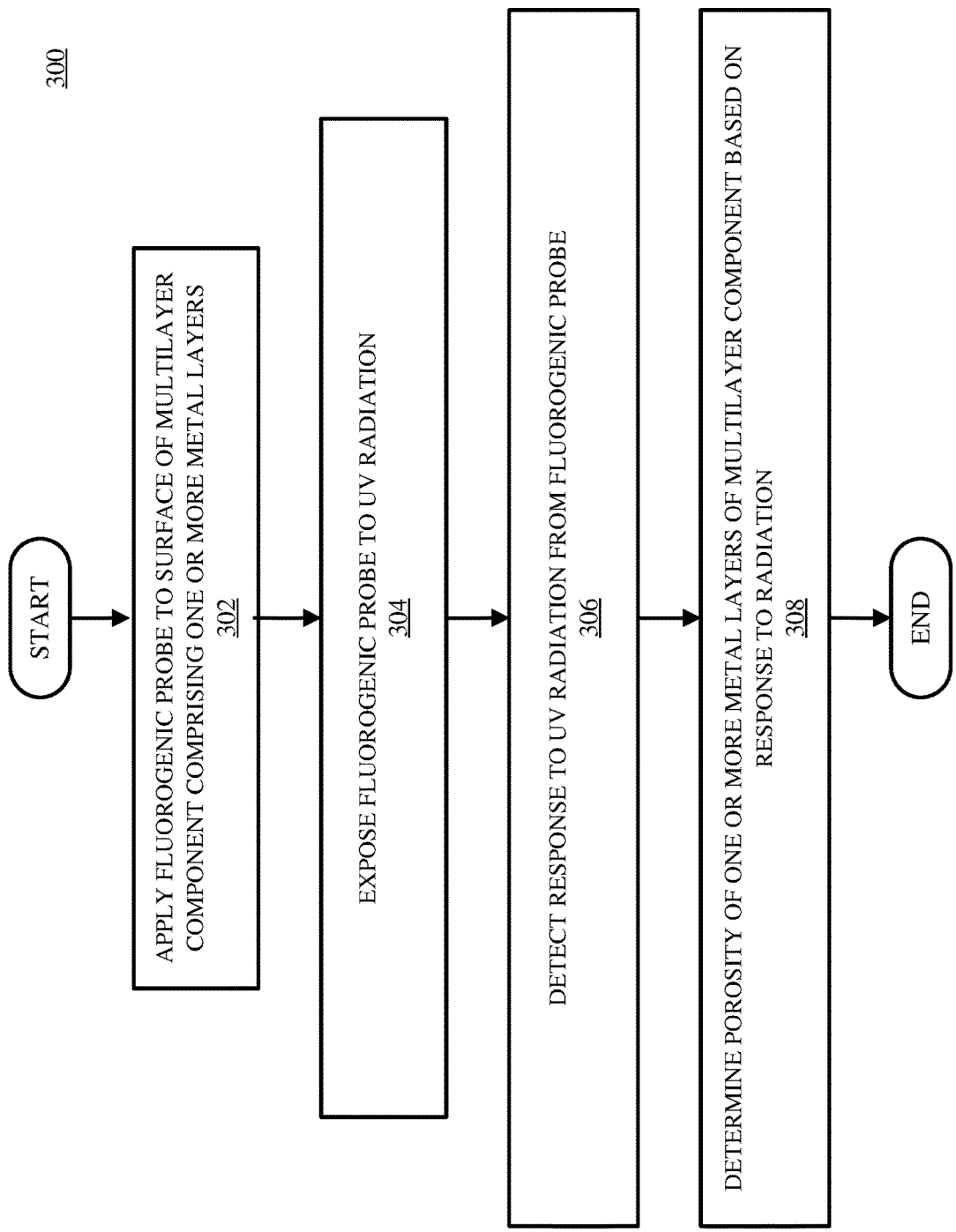
FIG. 3 is a block diagram illustrating a method of determining porosity in a multilayer component using fluorogenic probes, in accordance with some embodiments of the present disclosure.

FIG. 3 illustrates a flowchart of an example method 300 of a non-destructive method to determine porosity in metal coatings.

In method 300, a fluorogenic probe is applied to a surface of a multilayer component comprising one or more metal layers at block 302. In some embodiments, the fluorogenic probe is tailored to produce a first wavelength of light when it reacts with Cu and one or more other wavelengths of light when it reacts with Ni, Pd, and/or Au.

In method 300, a fluorogenic probe is exposed to UV radiation at block 304. In some embodiments, the UV radiation is a broad spectrum exposure. In some embodiments, the UV radiation is a narrow band of radiation designed to trigger a response to the fluorogenic probe.

In method 300, a sensor will detect re-emission or response to UV radiation in the fluorogenic probe at block 306. In some embodiments, the sensor will detect radiation over a base level of radiation. For example, a base reading level of radiation could be recorded with the radiation source on but before the multilayer component has been treated with the fluorogenic probe. In some embodiments, the sensor will only record radiation at specific wavelengths that indicate the presence of one or more exposed materials. In some embodiments, the sensor will detect the radiation that exceeds a threshold intensity level. For example, a level of acceptable porosity could be determined and associated with a base level of intensity.

In method 300, a porosity of the one or more metal layers of the multilayer component will be determined at block 308 based on the radiation re-emitted from the fluorogenic probes. In some embodiments, porosity will give a prevalence of pores that penetrate to a base material (e.g., Cu in layer 110 of FIG. 1). In some embodiments, porosity will give a prevalence of pores that penetrate to one or more of the layers of the multilayer component. For example, the intensity of wavelengths recorded at one or more indicator locations may be used to detect a prevalence of porosity penetrating to one or more of the layers in the multilayer component.

Figure 4:
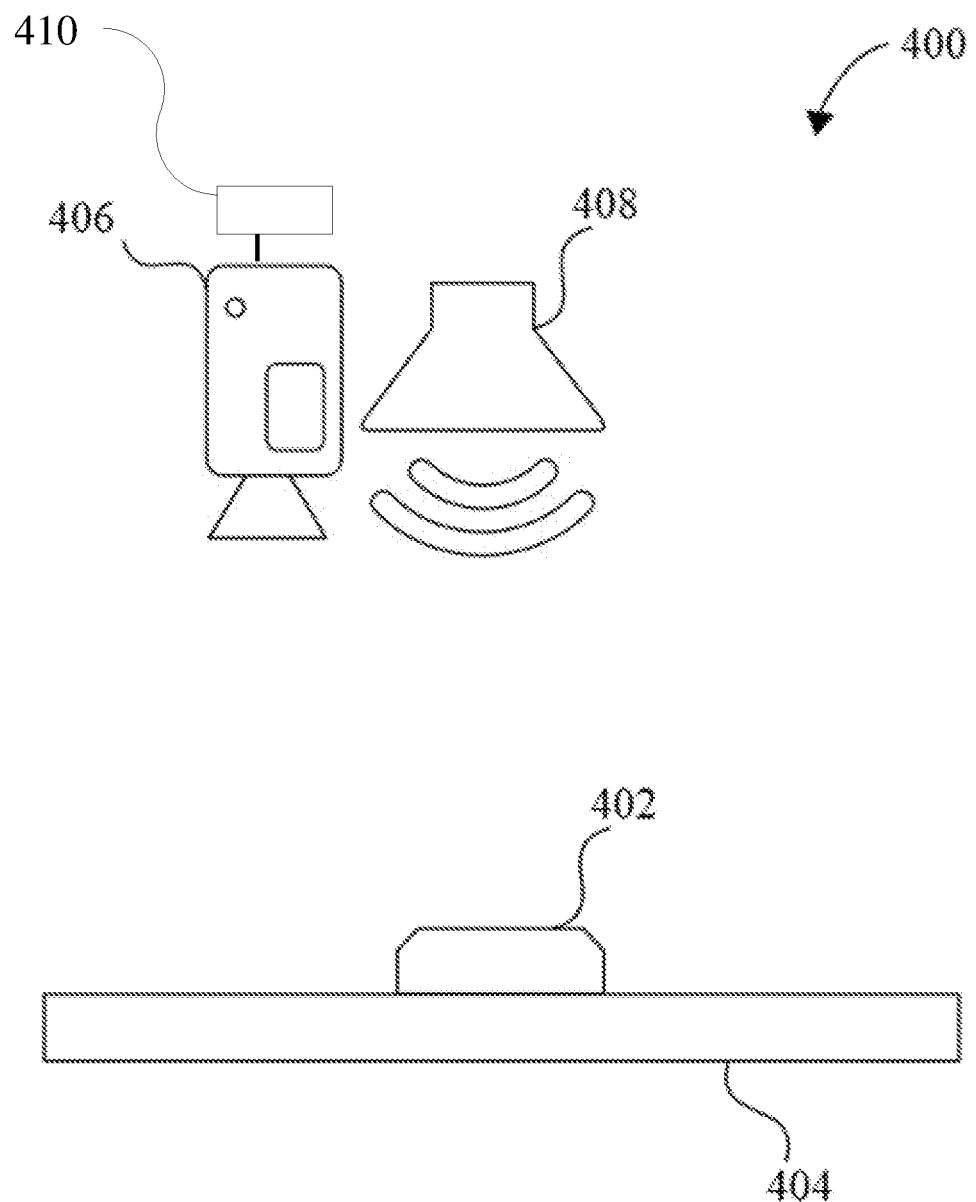
FIG. 4 illustrates an exemplary testing system, in accordance with some embodiments of the present disclosure.

FIG. 4 illustrates a diagram of an exemplary pore detection system 400. Pore detection system 400 consists of a radiation source 408, a radiation sensor 406, multilayer component 402, and a base 404. Base 404 is used for description purposes, other means of holding a multilayer component during testing are possible.

In some embodiments, multilayer component 402 can be coated with a fluorogenic probe before it is placed on base 404. For example, multilayer component 402 could be dipped in a fluorogenic probe solution before placing multilayer component 402 on base 404. In some embodiments, the coating system (not depicted) can be included in pore detection system 400. For example, multilayer component 402 could be spray coated after placement on base 404. Other methods of coating multilayer component 402 are possible. In some embodiments, the fluorogenic probe is dissolved or suspended in a solution before coating. In some embodiments, other steps such as agitation or drying may be involved in the coating process. In some embodiments, one or more processes may be used to promote distribution of the fluorogenic probe in the pores. For example, the sample could be vacuum cycled or ultrasonically agitated during the coating process.

In some embodiments, a fluorogenic probe coating on multilayer component 402 is exposed to radiation from radiation source 408. In some embodiments, radiation source 408 (e.g., radiation source 408 can take various forms including those discussed above regarding block 204 of FIG. 2.) distributes radiation in a broad area. In some embodiments, a radiation source has a narrow distribution area, such as a laser. In some embodiments, radiation source 408 distributes radiation in a broad spectrum of wavelengths. For example, the spectrum of wavelengths could span all UV ranges from 10 nm to 400 nm. In some embodiments, radiation source 408 emits radiation in a narrow spectrum of wavelengths. For example, the spectrum could range from 350 nm to 400 nm.

In some embodiments, radiation sensor 406 detects re-emission of radiation from the fluorogenic probe on multilayer component 402. In some embodiments, radiation sensor may be a visible, UV, and/or near-UV sensor, or may include more than one such sensor to detect multiple wavelengths. In some embodiments, the radiation sensor may include a transmission member, such as a light pipe or fiber optic, and may include a spectral analyzer. In some embodiments, radiation sensor 406 is a fluorescence scanner and includes microarray readers. In some embodiments, radiation sensor 406 resolves fluorescence as a function of spatial coordinates in two dimensions. For example, radiation sensor 406 may be used to determine what parts of a component have the highest porosity by sensing what areas of the parts are emitting certain wavelengths of light.

In some embodiment, the determination engine 410 is configured to demine a porosity of the multilayer component based on the response. In some embodiments, determination engine 410 is a computer system. In some embodiments, determination engine 410 performs steps of a method such as 208 or 308. In some embodiments, the determination engine reports recorded wavelengths and recorded intensities to a user. In some embodiments, determination engine 410 will compare readings from radiation sensor 406 to one or more test cases. In some embodiment, determination engine will compare the intensity of one or more detected wavelength values to one or more other wavelengths to determine a porosity of a sample.

Figure 5:
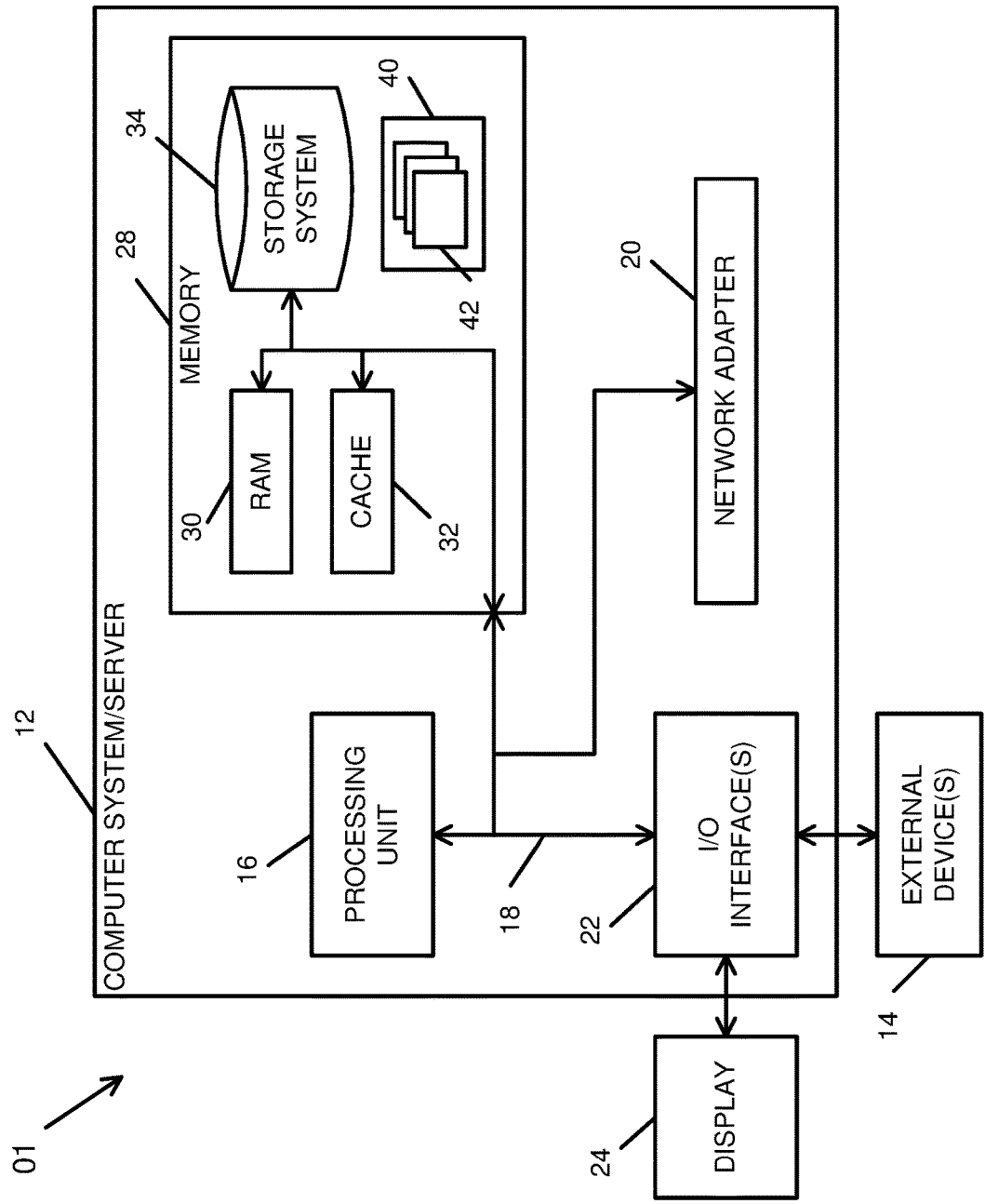
FIG. 5 depicts a computer system according to various embodiments of the present invention.

In an exemplary embodiment, the computer system is a computer system 01 as shown in FIG. 5. Computer system 01 is only one example of a computer system and is not intended to suggest any limitation as to the scope of use or functionality of embodiments of the present invention. Regardless, computer system 01 is capable of being implemented to perform and/or performing any of the functionality/operations of the present invention.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed:

1. A system comprising:
    a fluorogenic probe applied to a surface of a multilayer component, wherein the fluorogenic probe shows an increase in fluorescence in the presence of a specific material;
    a radiation source configured to expose the fluorogenic probe on the surface of the multilayer component to radiation;
    a sensor configured to detect a response to the radiation exposure of the fluorogenic probe; and
    a processor configured to determine a porosity of the multilayer component based on the response of the fluorogenic probe to the specific material and the radiation.

2. The system of claim 1, wherein the sensor is further configured to detect an intensity of the radiation at specific wavelengths.

3. A method comprising:
applying a fluorogenic probe to a surface of a multilayer component wherein the fluorogenic probe shows an increase in fluorescence in the presence of a specific material;
exposing the fluorogenic probe to radiation;
detecting a response, to the radiation exposure and the specific material, in the fluorogenic probe; and
determining a porosity of the multilayer component based on the detecting.

4. The method of claim 3, wherein the detecting further comprises detecting a first and a second wavelength of radiation emitted.

5. The method of claim 4, wherein the determining further comprises comparing a first intensity of the first wavelength to a second intensity of the second wavelength.

6. The method of claim 3, wherein the detecting comprises detecting an intensity of radiation emitted.

7. The method of claim 6, wherein the determining comprises comparing the intensity of the radiation emitted to one or more test cases.

8. The method of claim 3, wherein the applying further comprises coating the surface of the multilayer component with a fluorogenic probe solution containing the fluorogenic probe.

9. The method of claim 3, wherein the fluorogenic probe is designed to emit a first wavelength of radiation when it reacts with a first material and a second wavelength of radiation when it reacts with a second material.

10. The method of claim 3, wherein the response is compared to a base level measurement.

11. A method comprising:
applying a fluorogenic probe to a surface of a multilayer component comprising one or more metal layers, wherein the fluorogenic probe shows an increase in fluorescence in the presence of a specific material;
exposing the fluorogenic probe to ultraviolet (UV) radiation;
detecting a response, to the UV radiation and the specific material, from the fluorogenic probe; and
determining a prevalence of pores penetrating to a layer of the one or more metal layers based on the detecting.

12. The method of claim 11, wherein the one or more metal layers are selected from a group consisting of palladium, nickel, copper, gold, or some combination thereof.

13. The method of claim 12, wherein the fluorogenic probe produces an indication response for a material selected from the group consisting of palladium, nickel, copper, gold, or some combination thereof.

14. The method of claim 11, wherein the detecting further comprises detecting a first and a second wavelength of radiation emitted.

15. The method of claim 14, wherein the determining further comprises comparing an intensity of the first wavelength to an intensity of the second wavelength.

16. The method of claim 11, wherein the detecting comprises detecting an intensity of radiation emitted.

17. The method of claim 16, wherein the determining comprises comparing the intensity of the radiation emitted to one or more test cases.

18. The method of claim 11, wherein the applying further comprises coating the surface of the multilayer component with a fluorogenic probe solution containing the fluorogenic probe.

19. The method of claim 11, wherein the fluorogenic probe is designed for a detection of two or more materials.

20. The method of claim 11, wherein the response is compared to a baseline measurement.

* * * * *